(12) United States Patent
Iizuka

(10) Patent No.: US 11,676,286 B2
(45) Date of Patent: Jun. 13, 2023

(54) INFORMATION MANAGEMENT APPARATUS, INFORMATION MANAGEMENT METHOD, AND NON-TRANSITORY RECORDING MEDIUM

(71) Applicant: CASIO COMPUTER CO., LTD., Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 143 days.

(21) Appl. No.: 17/166,731

(22) Filed: Feb. 3, 2021

(65) Prior Publication Data

US 2021/0248759 A1 Aug. 12, 2021

(30) Foreign Application Priority Data

Feb. 7, 2020 (JP) .............................. JP2020-019569

(51) Int. Cl.
*G06T 7/246* (2017.01)
*G06T 7/73* (2017.01)
(Continued)

(52) U.S. Cl.
CPC .............. *G06T 7/246* (2017.01); *G06T 7/248* (2017.01); *G06T 7/73* (2017.01); *G06V 10/255* (2022.01);
(Continued)

(58) Field of Classification Search
CPC ........... G06T 2207/10016; G06T 7/248; G06T 7/246; G06T 7/73; G06T 2207/30204;
(Continued)

(56) References Cited

U.S. PATENT DOCUMENTS

2003/0021492 A1* 1/2003 Matsuoka ............. G06F 3/0386
382/295
2008/0030711 A1* 2/2008 Iizuka ..................... G01S 11/12
356/4.03

(Continued)

FOREIGN PATENT DOCUMENTS

AU 2006225115 A1 * 10/2007 ............. G03B 15/16
JP H10-255058 A 9/1998
(Continued)

OTHER PUBLICATIONS

JPO; Application No. 2020-019569; Notice of Reasons for Refusal dated Jan. 4, 2022.

*Primary Examiner* — Pinalben Patel

(74) *Attorney, Agent, or Firm* — Fitch, Even, Tabin & Flannery LLP

(57) ABSTRACT

An information management apparatus includes at least one processor configured to execute a program stored in a storage. The at least one processor acquires sequentially captured frames. The at least one processor acquires a movement state of a position of a light source in an imaging area, based on light source images contained in the acquired frames. The light source transmits information by means of light including an illumination pattern of the light. The at least one processor causes the storage to store the information and the movement state in association with each other.

21 Claims, 10 Drawing Sheets

(51) Int. Cl.
   *G06V 40/20* (2022.01)
   *G06V 10/60* (2022.01)
   *G06V 10/20* (2022.01)
   *G06V 20/52* (2022.01)
   *H04B 10/116* (2013.01)

(52) U.S. Cl.
   CPC .............. *G06V 10/60* (2022.01); *G06V 20/52* (2022.01); *G06V 40/28* (2022.01); *G06T 2207/10016* (2013.01); *H04B 10/116* (2013.01)

(58) Field of Classification Search
   CPC .... H04B 10/116; G06V 10/255; G06V 20/00; G06V 20/52; G06V 40/28; G06V 10/60
   See application file for complete search history.

(56) References Cited

U.S. PATENT DOCUMENTS

| | | | | |
|---|---|---|---|---|
| 2008/0298812 | A1* | 12/2008 | Nagatomo | H04B 10/1149 398/173 |
| 2016/0307332 | A1* | 10/2016 | Ranjan | A63F 13/5258 |
| 2018/0014736 | A1* | 1/2018 | Misharin | G06T 7/0012 |
| 2022/0092815 | A1* | 3/2022 | Iizuka | G06T 7/73 |
| 2022/0303468 | A1* | 9/2022 | Murakami | H04N 23/682 |

FOREIGN PATENT DOCUMENTS

| | | |
|---|---|---|
| JP | 2000214945 A | 8/2000 |
| JP | 2017-53739 A | 3/2017 |
| JP | 2019-152802 A | 9/2019 |

\* cited by examiner

FIG. 3A

| OPERATION PROCESS |
|---|
| (1) CAUSING RIGHT HAND 151 TO APPROACH TRAY 171 FOR PICKING UP PART |
| (2) CAUSING RIGHT HAND 151 TO BRING PART |
| (3) CAUSING LEFT HAND 152 TO APPROACH TOOL 161 FOR HOLDING TOOL 161 |
| (4) CAUSING LEFT HAND 152 TO BRING TOOL 161 |
| (5) PROCESSING PART WITH TOOL 161 |
| (6) COMPLETING OPERATION |

| BASIC INDEX TABLE | | |
|---|---|---|
| INDEX NUMBER | FRAME NUMBER | META-INFORMATION |
| 1 | 30 | ID=1 STARTS TO MOVE |
| 2 | 45 | MOVEMENT VECTOR OF ID=1 IS VARIED |
| 3 | 224 | ID=1 IS IN RESTING STATE<br>ID=2 STARTS TO MOVE |
| 4 | 239 | MOVEMENT VECTOR OF ID=2 IS VARIED<br>ID=10 STARTS TO MOVE |
| 5 | 410 | ID=1, 2, 10 MOVE WITHIN PREDETERMINED AREA |
| 6 | 524 | ALL IDS ARE IN RESTING STATE |

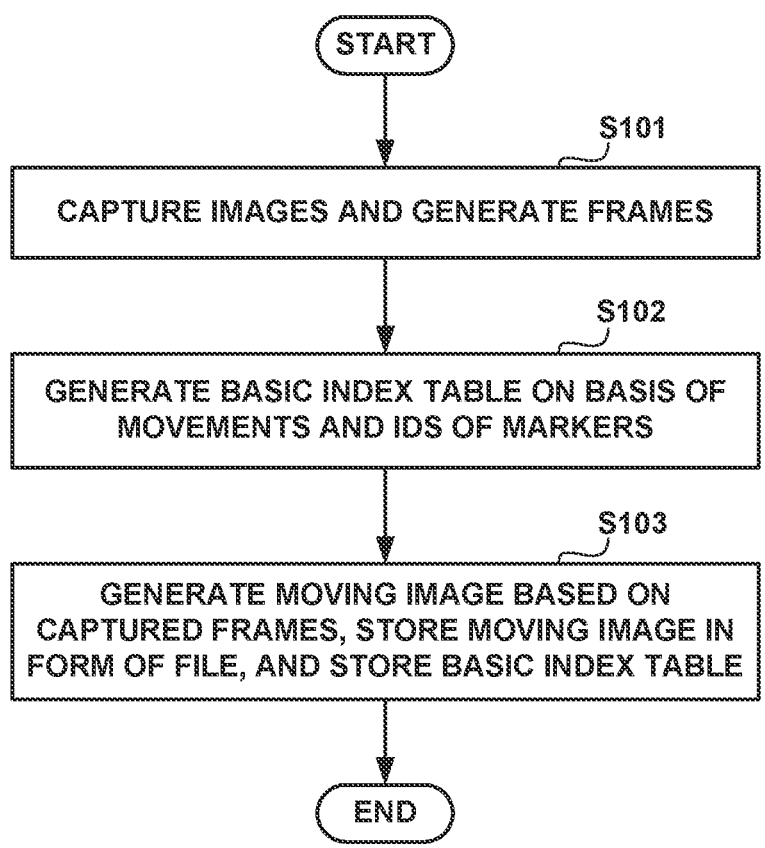

FIG. 6

| ELEMENT DEFINITION TABLE ||||
|---|---|---|---|
| ELEMENT NUMBER | ID | ELEMENT NAME | EXISTING AREA |
| 1 | 1 | RIGHT HAND 151 | NO |
| 2 | 2 | LEFT HAND 152 | NO |
| 3 | 10 | TOOL 161 | NO |
| 4 | 11 | TOOL 162 | NO |
| 5 | 101 | TRAY 171 | YES (-30,0)/(-5,50)/(-45,45)/(30,0) |

RELATION DEFINITION TABLE 403

| ELEMENT 1 | ELEMENT 2 | EXPRESSION OF POSITIONAL RELATION | OPERATION NAME | OPERATION TYPE |
|---|---|---|---|---|
| RIGHT HAND 151 | TRAY 171 | ELEMENT 1 INTO ELEMENT 2 | PICKING UP PART (GOING) | PREPARING OPERATION |
| RIGHT HAND 151 | TRAY 171 | ELEMENT 1 OUT FROM ELEMENT 2 | PICKING UP PART (RETURNING) | PREPARING OPERATION |
| RIGHT HAND 151 OR LEFT HAND 152 | TOOL 16 | ELEMENT 1 HIDDEN ELEMENT 2 OR ELEMENT 1 WITH ELEMENT 2 | HOLDING TOOL 161 | MAIN OPERATION |
| ...... | | | | |

FIG. 8

| BEHAVIOR SERIES TABLE | | | 404 |
|---|---|---|---|
| INDEX | FRAME NUMBER | OPERATION NAME | |
| 2-1 | 30 | PICKING UP PART (GOING) | |
| 2-2 | 45 | PICKING UP PART (RETURNING) | |
| 2-3 | 410 | HOLDING TOOL 161 | |
| ⋮ | ⋮ | ⋮ | |

INFORMATION MANAGEMENT APPARATUS, INFORMATION MANAGEMENT METHOD, AND NON-TRANSITORY RECORDING MEDIUM

CROSS-REFERENCE TO RELATED APPLICATION

This application claims the benefit of Japanese Patent Application No. 2020-019569, filed on Feb. 7, 2020, the entire disclosure of which is incorporated by reference herein.

FIELD

This application relates to an information management apparatus, an information management method, and a non-transitory recording medium.

BACKGROUND

In recent years, some systems have been devised that record moving images of operation sites (for example, factories and warehouses) and track and verify movements of people and objects for management purposes, thereby improving productivity and performing management of operations.

For example, Unexamined Japanese Patent Application Publication No. 2019-152802 discloses a technique that involves executing image analysis to acquire location information on body parts of an operator in a captured image and tracking behaviors of the body parts of the operator during a certain operation. This technique can achieve detection of an abnormal behavior in the operation on the basis of the image.

Unfortunately, the accuracy of detecting the positions of the body parts may be affected by the imaging environment in the above-mentioned technique.

SUMMARY

In order to solve the above problem, an information management apparatus according to a first aspect of the disclosure includes at least one processor configured to execute a program stored in a storage. The at least one processor acquires sequentially captured frames, acquires a movement state of a position of a light source in an imaging area based on light source images contained in the acquired frames, the light source transmitting information by means of light including an illumination pattern of the light, and causes the storage to store the information and the movement state in association with each other.

In order to solve the above problem, an information management method according to a second aspect of the disclosure, which is executed by an information management apparatus. The information management method includes acquiring frames sequentially captured by an imager, acquiring a movement state of a position of a light source in an imaging area based on light source images contained in the acquired frames, the light source transmitting information by means of light including an illumination pattern of the light; and causing a storage to store the information and the movement state in association with each other.

In order to solve the above problem, a non-transitory computer-readable recording medium according to a third aspect of the disclosure stores a program thereon executable by at least one processor of an information management apparatus. The program causes the at least one processor to acquire frames sequentially captured by an imager, acquire a movement state of a position of a light source in an imaging area based on light source images contained in the acquired frames, the light source transmitting information by means of light including an illumination pattern of the light, and cause a storage to store the information and the movement state in association with each other.

BRIEF DESCRIPTION OF THE DRAWINGS

A more complete understanding of this application can be obtained when the following detailed description is considered in conjunction with the following drawings, in which:

FIG. 3A illustrates exemplary behaviors of an operator according to the embodiment, and FIG. 3B illustrates an exemplary basic index table according to the embodiment;

FIG. 4 is a flowchart illustrating exemplary operations of the camera and the server according to the embodiment;

FIG. 6 illustrates an exemplary element definition table according to the embodiment;

FIG. 7 illustrates an exemplary relation definition table according to the embodiment;

FIG. 8 illustrates an exemplary behavior series table according to the embodiment;

FIG. 9A is a circuit configuration diagram, and FIG. 9B is an appearance diagram; FIG. 10A is a circuit configuration diagram, and FIG. 10B is an appearance diagram.

DETAILED DESCRIPTION

A visible light communication system as an information management system according to embodiments of the disclosure will now be described with reference to the accompanying drawings.

Figure 1:
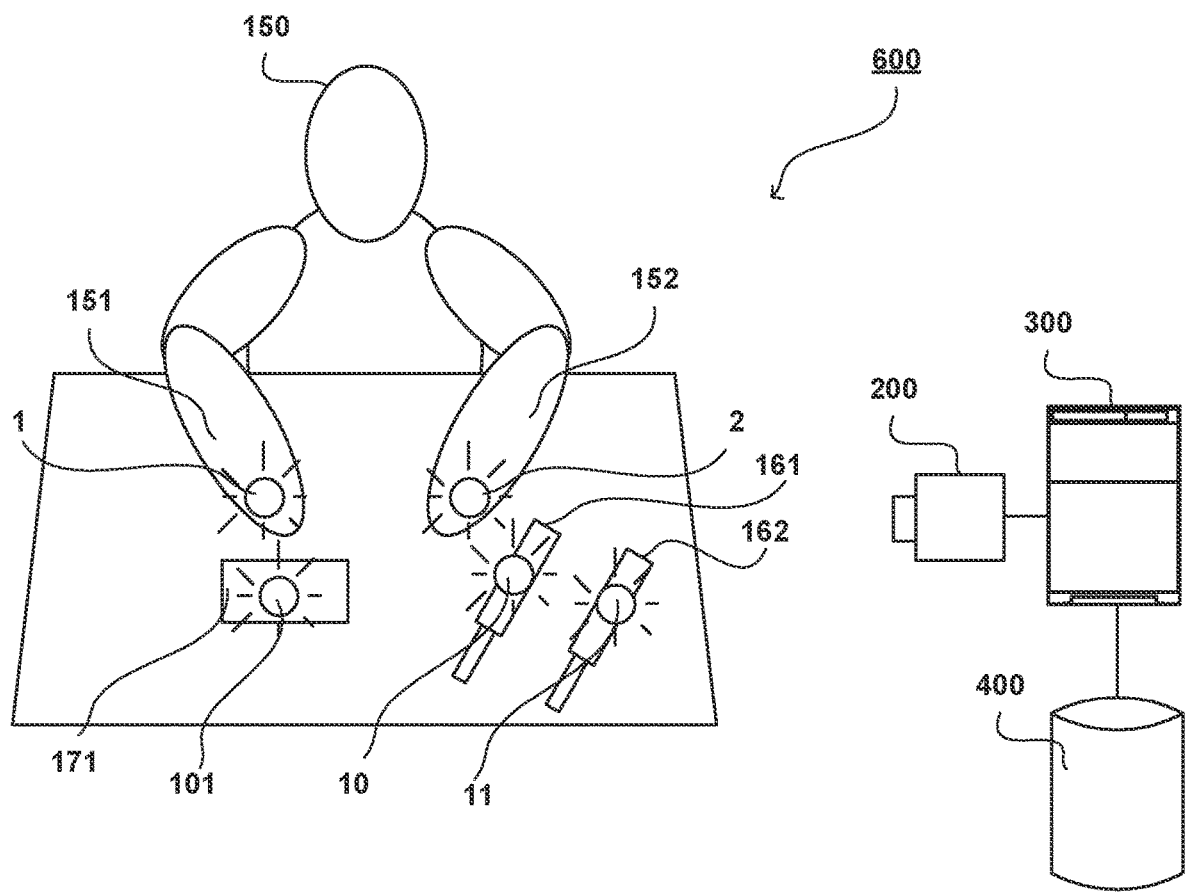
FIG. 1 illustrates an exemplary visible light communication system according to an embodiment of the disclosure.

FIG. 1 illustrates an exemplary configuration of a visible light communication system. A visible light communication system 600 illustrated in FIG. 1 generates information corresponding to behaviors of an operator 150. The visible light communication system 600 includes markers 1, 2, 10, 11, and 101 (hereinafter referred to collectively as "marker 1 and the like" as appropriate), a camera 200, a server 300, and a database 400.

In this embodiment, each of the marker 1 and the like (light source) includes a light emitting diode (LED) (not shown) as an illumination device. The camera 200 is connected to the server 300.

The marker 1 is mounted on a right hand 151 of the operator 150, and the marker 2 is mounted on a left hand 152 of the operator 150. The marker 10 is mounted on a tool 161 used by the operator 150, and the marker 11 is mounted on a tool 162 used by the operator 150. The marker 101 is mounted on a tray 171 on which parts (not shown) are placed thereon.

The LED in each of the marker 1 and the like transmits an identification (ID) that is information for uniquely identifying the marker 1 or the like including the LED by emitting a light modulated by means of a variation in hue with time. In the embodiment, the marker 1 has an ID of 1, the marker 2 has an ID of 2, the marker 10 has an ID of 10, the marker 11 has an ID of 11, and the marker 101 has an ID of 101.

The camera 200 captures an image of the space encompassing the marker 1 and the like. The server 300 acquires information, such as the IDs of the marker 1 and the like, from the image of lights (light source image) captured by the camera 200.

Figure 2:
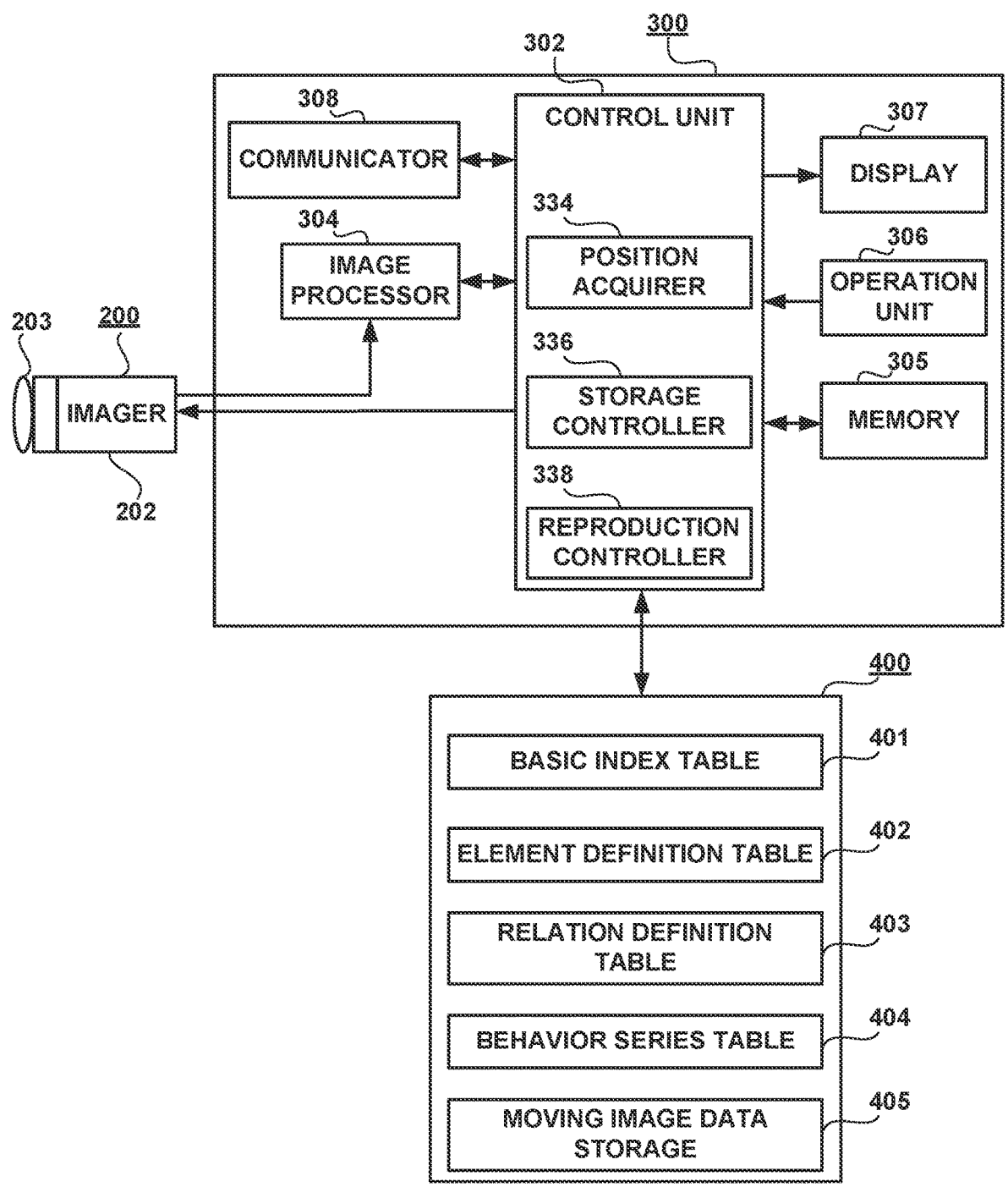
FIG. 2 illustrates exemplary configurations of a camera, a server, and a database according to the embodiment.

FIG. 2 illustrates exemplary configurations of the camera 200, the server 300, and the database 400. The camera 200 and the server 300 constitute an information management apparatus. As illustrated in FIG. 2, the camera 200 includes an imager 202 and a lens 203. The server 300 includes a control unit 302, an image processor 304, a memory 305, an operation unit 306, a display 307, and a communicator 308.

The lens 203 in the camera 200 is a zoom lens, or the like. The lens 203 is shifted in response to a zooming control operation from the operation unit 306 in the server 300 and a focusing control by the control unit 302. The shift of the lens 203 controls the angle of view of the imager 202 and optical images captured by the imager 202.

The imager 202 is equipped with multiple light receiving elements arranged in a regular two dimensional array and the multiple light receiving elements form a light receiving surface including an imaging surface. The light receiving elements are each an imaging device, such as a charge coupled device (CCD) or a complementary metal oxide semiconductor (CMOS). The imager 202 performs successive capturing (light receiving) of optical images incident through the lens 203 in a predetermined range of angle of view, in accordance with a control signal from the control unit 302 in the server 300. The imager 202 then converts image signals within the angle of view into digital data to generate frames (captured images). The imager 202 captures an image and generates an image frame sequentially in time, and outputs the successive frames to the image processor 304.

The image processor 304 outputs digital data on the frames output from the imager 202, to the control unit 302, in accordance with a control signal from the control unit 302.

The control unit 302 includes a central processing unit (CPU), for example. The control unit 302 executes software processes in accordance with programs stored in the memory 305, and thereby controls various functions of the server 300, such as a function of conducting the operations explained later.

The memory 305 includes, for example, a random access memory (RAM) and a read only memory (ROM). The memory 305 stores various information, such as programs, to be used in controls and the like in the server 300, and the digital data on the frames output from the image processor 304 to the control unit 302.

The operation unit 306 includes a numeric keypad, function keys, and the like and serves as an interface for input of an operation of a user. The display 307 is, for example, a liquid crystal display (LCD), a plasma display panel (PDP), or an electroluminescence (EL) display. The display 307 displays an image in accordance with the image signal output by the control unit 302. The communicator 308 includes, for example, a local area network (LAN) card. The communicator 308 communicates with external communication apparatuses.

The control unit 302 is configured by a position acquirer 334, a storage controller 336, and a reproduction controller 338.

The position acquirer 334 acquires the positions corresponding to the marker 1 and the like in each of the images (hereinafter referred to as "frames") continuously output from the image processor 304 in the chronological order. For example, the position acquirer 334 determines the sites having a luminance value equal to or greater than a predetermined value in the frame, as the positions corresponding to the marker 1 and the like in the frame.

The storage controller 336 detects IDs associated with the illumination patterns (variations in luminance and color) at the positions of the marker 1 and the like in the frame, and calculates movement vectors indicating variations with time of the positions corresponding to the marker 1 and the like.

Specifically, the storage controller 336 specifies the positions of each marker corresponding to the identical ID in the current frame and the last frame among the frames continuously output from the image processor 304 in the chronological order. The storage controller 336 then calculates a length and angle of the movement vector, starting at the position of the marker in the last frame and ending at the position of the marker in the current frame. The calculated length and angle indicate a displacement of the marker corresponding to the identical ID. In the case where the marker corresponding to the identical ID resides at the same position in both of the current frame and the last frame, the movement vector is calculated as 0. In response to every output of a new frame from the image processor 304 to the control unit 302, the lengths and angles of the movement vectors of the markers in the frame are calculated as explained above.

The storage controller 336 then compares the latest movement vector and the last movement vector of the identical marker and determines whether the variation in at least one of the length and angle exceeds a predetermined threshold. If the variation in at least one of the length and angle is determined to exceed the predetermined threshold, the storage controller 336 generates basic index information indicating a movement of the marker.

An exemplary generation of basic index information will now be explained. FIG. 3A illustrates exemplary operation process executed by a certain operator 150, and FIG. 3B illustrates an exemplary basic index table 401, which is a collection of basic index information corresponding to behaviors of the operator 150. The basic index table 401 is stored in the database 400 as explained later.

As illustrated in FIG. 3A, the operation process executed by the operator 150 involves:
(1) causing the right hand 151 to approach the tray 171 for picking up a part;
(2) causing the right hand 151 to bring the part;
(3) causing the left hand 152 to approach the tool 161 for holding the tool 161;
(4) causing the left hand 152 to bring the tool 161; and
(5) processing the part with the tool 161,
executed by the operator 150.

The operation of "(1) causing the right hand 151 to approach the tray 171 for picking up a part" in FIG. 3A is defined as a mode in which the position of ID=1 (at which the marker 1 mounted on the right hand 151 emits light and transmits information) starts to move from a resting state. This mode is managed as Index No. 1 in the basic index table 401 illustrated in FIG. 3B. Index No. 1 is associated with the frame number "30", which indicates the time point when a variation in at least one of the length and angle of the movement vector of ID=1 exceeds a first threshold. Index No. 1 is also associated with meta-information that "ID=1 (that is, the right hand 151) starts to move". Specifically, the first threshold is defined assuming at least one of the case in which the length of the movement vector is a predetermined length or longer (that is, the moving speed between frames is a predetermined speed or higher) and the case in which the angle of the movement vector is inverted (specifically, the variation in the angle is approximately 150° or larger).

The operation of "(2) causing the right hand 151 to bring the part" in FIG. 3A is defined as a mode in which the angle of the movement vector of ID=1 is varied (specifically, the moving direction is substantially inverted). This mode is managed as Index No. 2 in the basic index table 401 illustrated in FIG. 3B. Index No. 2 is associated with the frame number "45", which indicates the time point when a variation in the angle of the movement vector of ID=1 exceeds the first threshold due to inversion of the moving direction. Index No. 2 is also associated with meta-information that "the movement vector of ID=1 (that is, the right hand 151) is varied".

The operation of "(3) causing the left hand 152 to approach the tool 161 for holding the tool 161" in FIG. 3A is defined as a mode in which while the position of ID=1 is in a resting state, the position of ID=2 (at which the marker 2 mounted on the left hand 152 emits light and transmits information) starts to move from a resting state, and then the position of ID=2 and the position of ID=10 (at which the marker 10 mounted on the tool 161 emits light and transmits information) reside within a predetermined area. This mode is managed as Index No. 3 in the basic index table 401 illustrated in FIG. 3B. Index No. 3 is associated with the frame number "224", which indicates the time point when a variation in at least one of the length and angle of the movement vector of ID=2 exceeds a first threshold while the position of ID=1 is constant and then the position of ID=2 and the position of ID=10 enter the predetermined area. Index No. 3 is also associated with meta-information that "ID=1 (that is, the right hand 151) is in a resting state and ID=2 (that is, the left hand 152) starts to move".

The operation of "(4) causing the left hand 152 to bring the tool 161" in FIG. 3A is defined as a mode in which the angle of the movement vector of ID=2 is varied (specifically, the moving direction is inverted) and the position of ID=10 starts to move from a resting state together with the position of ID=2 at the same timing. This mode is managed as Index No. 4 in the basic index table 401 illustrated in FIG. 3B. Index No. 4 is associated with the frame number "239", which indicates the time point when the angle of the movement vector of ID=2 is varied due to inversion of the moving direction and the positions of ID=2 and ID=10 start to move together. Index No. 4 is also associated with meta-information that "the movement vector of ID=2 (that is, the left hand 152) is varied and ID=10 (that is, the tool 161) starts to move".

The operation of "(5) processing the part with the tool 161" in FIG. 3A is defined as a mode in which the positions of ID=1, 2, and 10 move within the predetermined area. This mode is managed as Index No. 5 in the basic index table 401 illustrated in FIG. 3B. Index No. 5 is associated with the frame number "410", which indicates the time point when the positions of ID=1, 2, and 10 reside within the predetermined area and variations in (lengths and angles of) the movement vectors are smaller than a predetermined second threshold. Index No. 5 is also associated with meta-information that "ID=1 (that is, the right hand 151), ID=2 (that is, the left hand 152), and ID=10 (that is, the tool 161) move within the predetermined area". Specifically, the second threshold is defined assuming the case in which the lengths of the movement vectors are shorter than the predetermined length defined by the first threshold (that is, the moving speed between frames is at most the predetermined speed defined by the second threshold).

The operation of "(6) completing the operation" in FIG. 3A is defined as a mode in which all the IDs in the imaging area are in a resting state. This mode is managed as Index No. 6 in the basic index table 401 illustrated in FIG. 3B. Index No. 6 is associated with the frame number "524", which indicates the time point when variation cannot be found at the positions of ID=1, 2, 10, 11, and 101, and associated with meta-information that "all the IDs are in a resting state".

Figure 5:
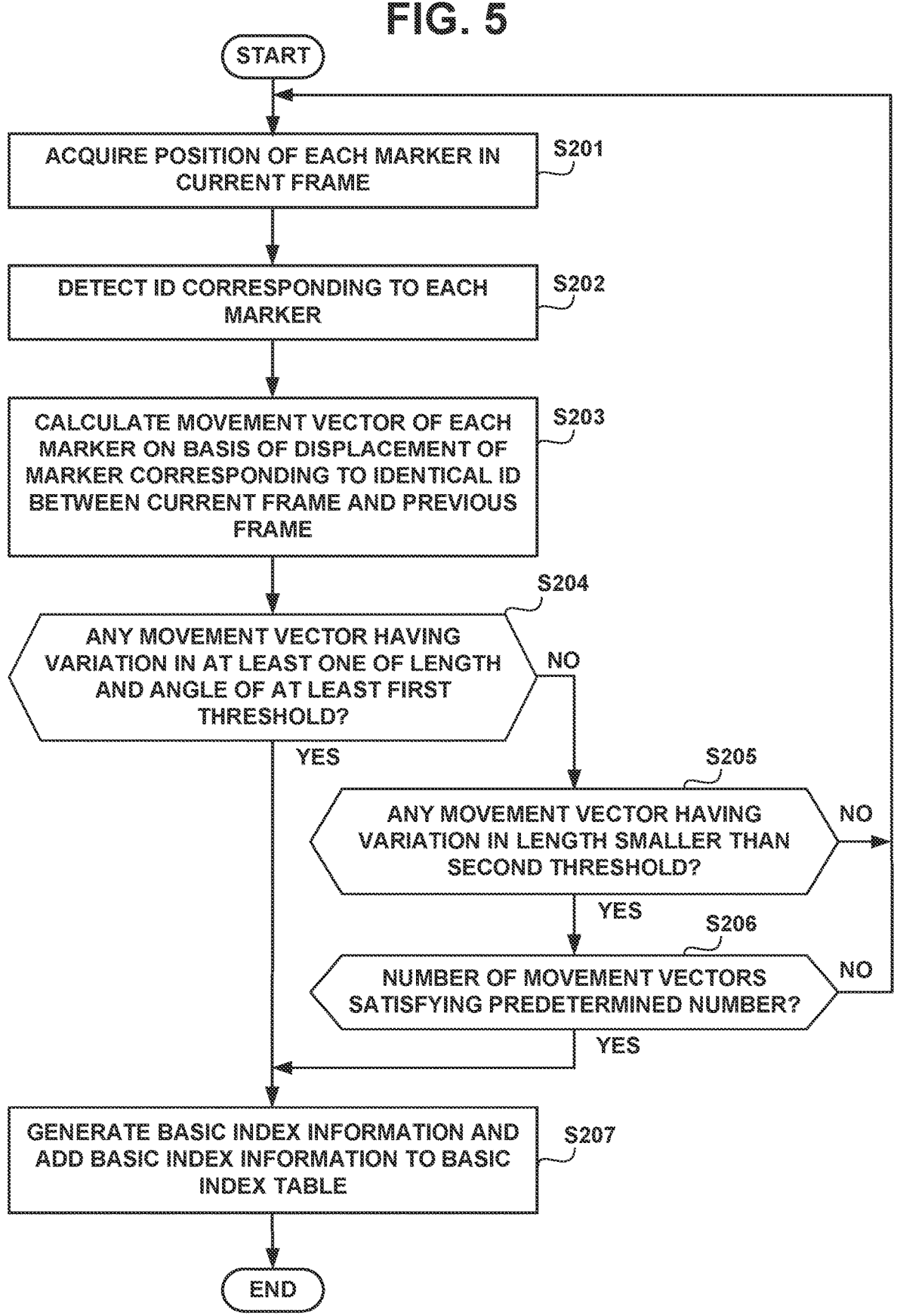
FIG. 5 is a flowchart illustrating an exemplary operation of generating a basic index table executed by the server according to the embodiment.

The operations of generating the basic index table 401 will now be explained. FIG. 4 is a flowchart illustrating the entire operations executed by the camera 200 and the server 300. FIG. 5 is a flowchart illustrating the operation of the server 300 among the entire operations.

First, the imager 202 in the camera 200 conducts successive image capturing and sequentially generates frames (Step S101).

The control unit 302 of the server 300 then generates the basic index table 401 on the basis of movements of the markers in the frames and the IDs of the markers (Step S102).

Step S102 will be explained in more detail. As illustrated in FIG. 5, the position acquirer 334 in the control unit 302 of the server 300 acquires the positions of the markers in the current frame (latest frame) (Step S201).

The storage controller 336 in the control unit 302 then detects IDs associated with the illumination patterns at the positions of the markers in the frames (Step S202).

The storage controller 336 then calculates a movement vector of each marker on the basis of a displacement of the marker corresponding to the detected identical ID between the current frame and the last frame (precedent frame) (Step S203).

The storage controller 336 then compares the latest movement vector and the last movement vector corresponding to the identical ID and determines whether any movement vector has a variation in at least one of the length and angle that is equal to or greater than the first threshold (Step S204).

If variations in both of the lengths and angles of all the movement vectors are determined to be smaller than the first threshold (Step S204; NO), the storage controller 336 compares the latest movement vector and the last movement vector corresponding to the identical ID and determines whether any movement vector has a variation in the length that is smaller than the second threshold (Step S205). If any movement vector is determined to have a variation in the length that is smaller than the second threshold (Step S205; YES), the storage controller 336 determines whether the number of the movement vectors whose variation in the length is smaller than the second threshold satisfies a predetermined number (Step S206). The storage controller 336 then generates basic index information corresponding to the ID of the movement vector that satisfies the conditions of Steps S204 to S206 and adds the generated basic index information to the basic index table 401 (Step S207). In contrast, if any of the conditions of Steps S204 to S206 are not satisfied, the process returns to Step S201.

It should be noted that the above-explained conditions of the length and angle of the movement vector required for addition of information to the basic index table 401 are mere examples and not limited thereto. For example, the conditions required for addition of information to the basic index table 401 involve the case in which the lengths of all the movement vectors are maintained to be 0 for a certain period, which is deemed as a mode of "completing the operation", the case in which some IDs gather within the predetermined area or move away from each other, and other various cases of movement of IDs.

Referring back to FIG. 4, the storage controller 336 generates moving image data containing sequentially captured frames, converts the data into a file, stores the file into a moving image data storage 405 of the database 400, and also stores the generated basic index table 401 into the database 400 (Step S103). The moving image data and the basic index table 401 are stored in association with each other.

Referring back to FIG. 2, the above-explained process of generating and storing the basic index table 401 is followed by the process explained below. The reproduction controller 338 in the control unit 302 causes the information in the basic index table 401 to be displayed on the display 307.

While checking out the content in the basic index table 401 displayed on the display 307, a user designates a frame number that the user desires to reproduce in the moving image data corresponding to the basic index table 401.

In response to designation of the frame number to be reproduced, the reproduction controller 338 reads the moving image data stored in the moving image data storage 405, reads the frame corresponding to the designated frame number from the moving image data, and then causes the frame to be reproduced and displayed on the display 307. The user can thus reproduce the moving image containing the designated frame and the following frames of the moving image data.

The user also executes an operation of generating an element definition table 402 with reference to the basic index table 401 and the moving image data. The element definition table 402 specifies the existing areas of the objects (elements) provided with the markers 1 and the like corresponding to the IDs in the frames.

FIG. 6 illustrates an exemplary element definition table 402. As illustrated in FIG. 6, the element definition table 402, which is generated for each ID, contains element numbers, IDs, the names of the objects (elements) provided with the marker 1 and the like corresponding to the IDs, and existing areas (coordinates of the four corners of the rectangular areas) of the elements in the frames. In this embodiment, the existing area is set only for the tray 171. Since the existing area is set for the tray 171, the movement of the marker 1 into this existing area of the tray 171 represents that the element name "right hand 151" approaches the element name "tray 171" to pick up a part, for example. Also, the movement of the marker 1 that has been in the existing area of the tray 171 out of the existing area represents that the element name "right hand 151" picks up a part out of the element name "tray 171". The element definition table 402 generated as explained above is stored into the database 400.

The user also executes an operation of generating a relation definition table 403 with reference to the basic index table 401 and the moving image data. The relation definition table 403 illustrates positional relationships of the objects (elements) provided with the marker 1 and the like corresponding to the IDs.

FIG. 7 illustrates an exemplary relation definition table 403. As illustrated in FIG. 7, the relation definition table 403 contains "elements" (elements 1 and 2 in this example) identified by the IDs of the respective markers, "expression of positional relation" that represents elements and a condition of positional relationship between the elements, "operation name", and "operation type". In FIG. 7, the expression "element 1 into element 2" indicates that the position of "element 1" becomes overlapped with "predetermined area centered around the position of the element 2". In this case, "element 1" and "element 2" are connected by the term "into". The expression "element 1 out from element 2" indicates that "element 1" that has been within "predetermined area centered around the position of the element 2" moves "away from" the predetermined area. In this case, "element 1" and "element 2" are connected by the term "out from". It should be noted that the terms "into" and "out from" are used provided that either of the elements 1 and 2 has an existing area illustrated in FIG. 6. The expression "element 1 hidden element 2" indicates that the position of "element 1" becomes hidden behind "predetermined area centered around the position of the element 2". Specifically, the expression indicates that the position of the ID corresponding to "element 1" moves to the vicinity of the position of the ID corresponding to "element 2" and then becomes hidden behind "element 2" and cannot be specified. The expression "element 1 with element 2" indicates that the positions of "element 1" and "element 2" reside within the predetermined area and their movement vectors have approximately the same lengths and angles, that is, "element 1" and "element 2" perform the same movement. The expression "element 1 uncover element 2", which is not listed in FIG. 7, indicates that "element 1" that has been hidden behind "element 2" appears again. The operation type is information for classifying an operation of the entire operation process as "preparing operation" or "main operation". The "main operation" indicates an operation to be mainly a check target in the entire operation process, and the "preparing operation" indicates a phase of preparation of the "main operation". The relation definition table 403 generated as explained above is stored into the database 400.

The user also executes an operation of generating a behavior series table 404 with reference to the basic index table 401 and the moving image data. The behavior series table 404 contains the operation names of the respective operation processes executed by the operator 150 and recorded in the moving image data, in association with the frame numbers of the moving image data.

FIG. 8 illustrates an exemplary behavior series table 404. As illustrated in FIG. 8, the behavior series table 404 contains indexes set for the individual process names, frame numbers of the frames of the moving image data that record the processes associated with the process names, and process names to be subject to conformity determination. The generated behavior series table 404 is stored into the database 400.

The above-explained tables (the basic index table 401, the element definition table 402, the relation definition table 403, and the behavior series table 404) serving as reference information tables are generated and stored into the database 400. Then, another operator, whose right hand 151 is provided with the marker 1 transmitting ID=1 and left hand 152 is provided with the marker 2 transmitting ID=2, performs the operations in the above-explained operation process. A moving image of this operator is captured at the same angle as in the capturing of the moving image data associated with the generated tables. On the basis of the positions of the markers (markers 1, 2, 10, 11, and 101) in the frames sequentially captured and output, the variations in the lengths and angles of the movement vectors are acquired and compared with the contents of the tables, so as to determine whether the current operator succeeds to perform the processes in the operation process in accordance with the contents of the tables. Specifically, the control unit 302 reads the tables 401 to 404 corresponding to an operation process to be evaluated from the database 400. The control unit 302 then refers to the read tables and determines whether the behavior of the current operator matches the reference behavior in the operation process, or whether the initial frame associated with the process name is identical to the reference initial frame or within a predetermined allowable range, on the basis of the variations in the lengths and angles of the movement vectors of the markers in the frames sequentially captured and output. If determining that the initial frame is identical or within the allowable range, the control unit 302 determines no problem in the behavior in the operation process by the current operator. If determining that the initial frame is different or out of the allowable range in any behavior in the operation process, the control unit 302 provides an alert screen or notification at this timing for informing the user that the behavior does not matches the reference behavior, for example.

The above description of the embodiment and the drawings should not be construed as limiting the disclosure and may be modified as appropriate.

For example, although the marker 1 and the like transmit only IDs in the above embodiment, the marker 1 and the like may transmit other information.

Figure 9A:
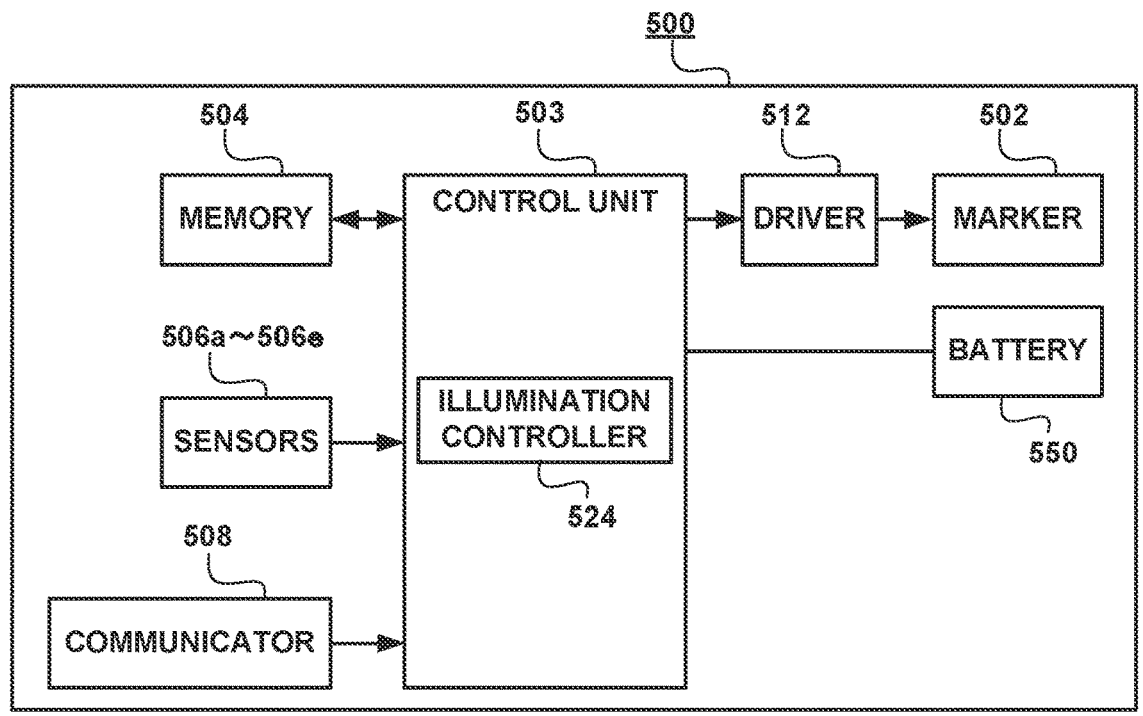
FIGS. 9A and 9B illustrate an exemplary transmission apparatus according to another embodiment of the disclosure.
Figure 9B:
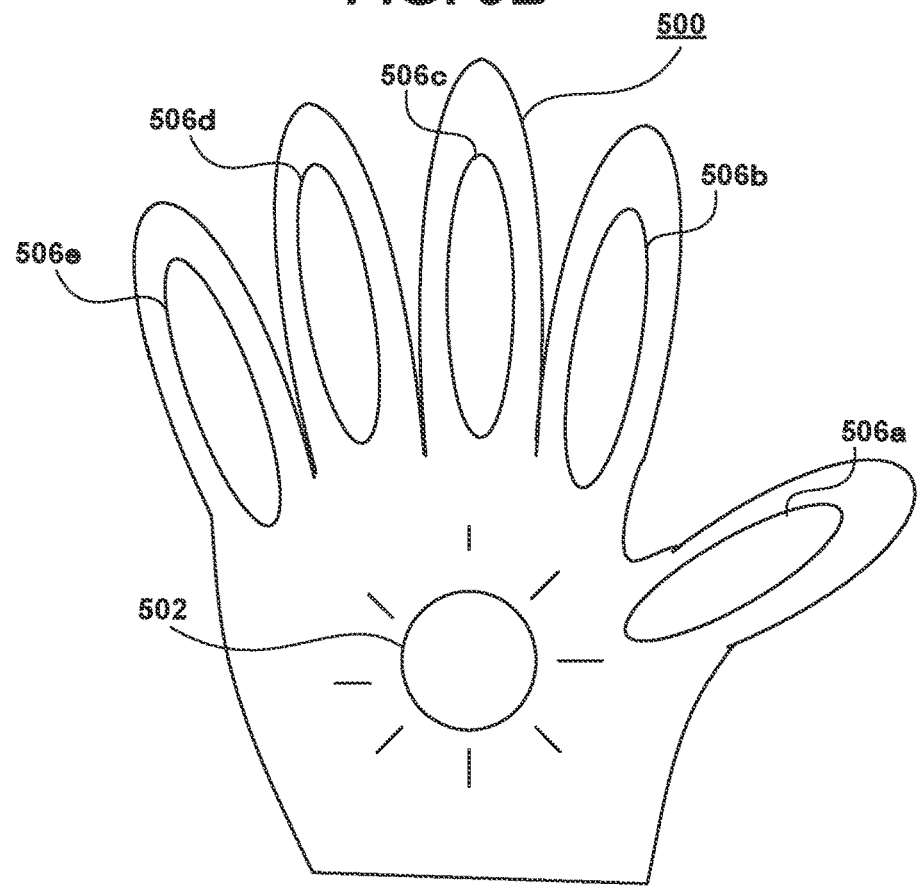

FIG. 9A is a circuit configuration diagram of another transmission apparatus 500, and FIG. 9B illustrates an appearance diagram of the other transmission apparatus 500. The transmission apparatus 500 illustrated in FIG. 9A includes a marker 502, a control unit 503, a memory 504, sensors 506a to 506e, a communicator 508, a driver 512, and a battery 550. As shown in the appearance diagram of FIG. 9B, the transmission apparatus 500 has a glove-like shape and is provided with the sensors 506a to 506e for detecting extension and contraction at the respective positions corresponding to the five fingers. The transmission apparatus 500 is also provided with the marker 502 at the position corresponding to the back of the hand. The marker 502 is mounted on the hand of an operator that mainly performs behaviors.

Referring back to FIG. 9A, the control unit 503 includes a CPU, for example. The control unit 503 executes software processes in accordance with programs stored in the memory 504, and thereby controls various functions of the transmission apparatus 500.

The memory 504 includes, for example, a RAM and a ROM. The memory 504 stores various information, such as programs, to be used in controls and the like in the transmission apparatus 500. The sensors 506a to 506e detect movements of the fingers of the operator. The communicator 508 is a wireless communicator and communicates with other communication devices, such as the server 300. The battery 550 supplies the individual components with electric power necessary for operations of the transmission apparatus 500.

The control unit 503 is configured by an illumination controller 524. The illumination controller 524 determines an illumination pattern of light to be emitted from the marker 502, in association with the ID of the transmission apparatus 500 and information on the movements of the fingers of the operator detected by the sensors 506a to 506e.

In addition, the illumination controller 524 outputs information on the illumination pattern associated with the ID and movements of the fingers to the driver 512. On the basis of the information on the illumination pattern from the illumination controller 524, the driver 512 generates a driving signal for causing a variation with time of the light to be emitted from the marker 502. The marker 502 emits light in accordance with the driving signal output from the driver 512.

Because of this transmission apparatus 500, the server 300 can generate a more detailed basic index table 401 that also reflects movements of the fingers of the operator.

Figure 10A:
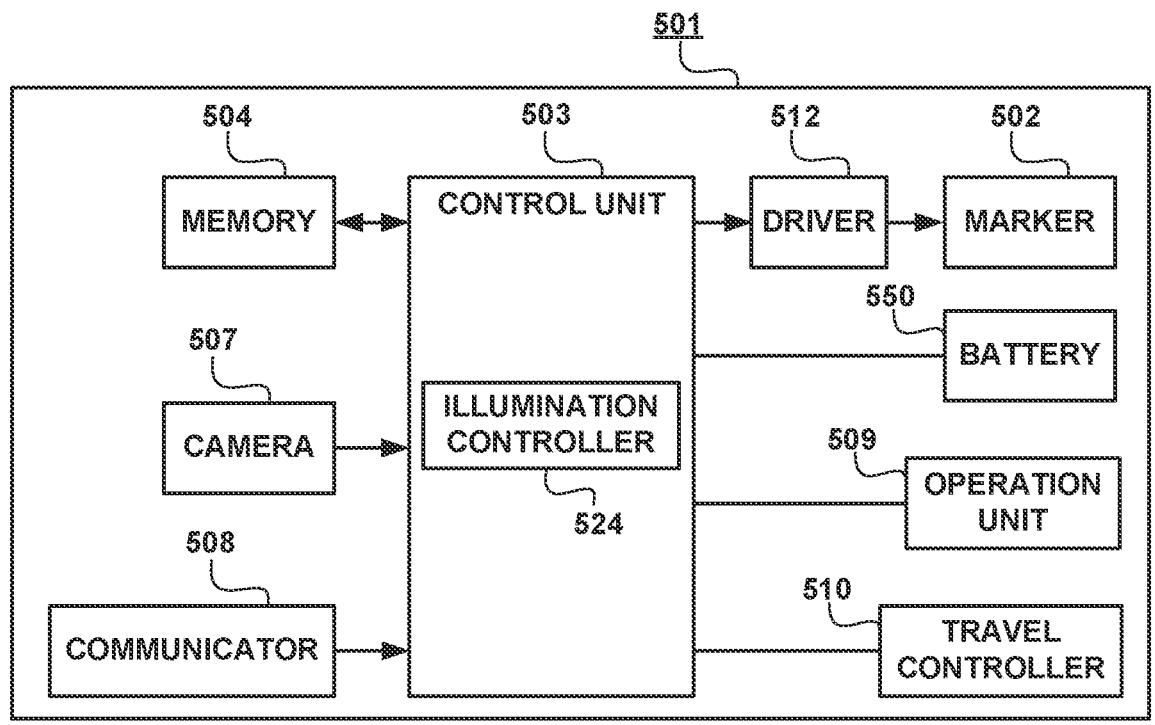
FIGS. 10A and 10B illustrate another exemplary transmission apparatus according to still another embodiment of the disclosure.
Figure 10B:
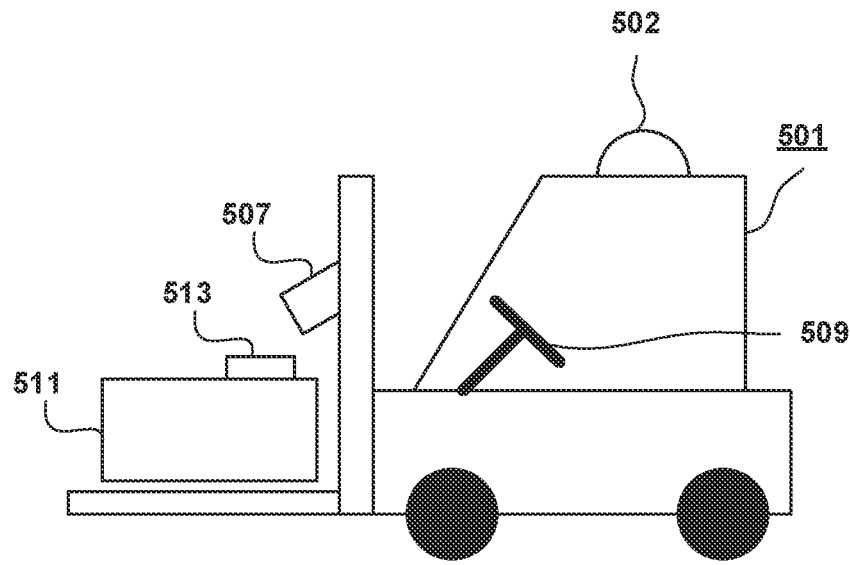

FIG. 10A is a circuit configuration diagram of still another transmission apparatus 501, and FIG. 10B illustrates an appearance diagram of the other transmission apparatus 501. The transmission apparatus 501 illustrated in FIGS. 10A and 10B is equipped with a camera 507 instead of the sensors 506 of the transmission apparatus 500 illustrated in FIG. 9.

As illustrated in FIG. 10B, the transmission apparatus 501 is a moving body, such as a forklift. The forklift travels when a travel controller 510 is controlled by operation of an operation unit 509, for example, and carries a load 511. The load 511 is labelled with a barcode 513 for identifying the type of the load 511. The camera 507 captures an image of the barcode 513.

Referring back to FIG. 10A, the illumination controller 524 in the control unit 503 determines an illumination pattern of light to be emitted from the marker 502, in association with the ID of the transmission apparatus 501 and information on the type of the load 511 indicated by the barcode 513 in the image captured by the camera 507.

In addition, the illumination controller 524 outputs information on the illumination pattern associated with the ID and the information on the type of the load 511 to the driver 512. On the basis of the information on the illumination pattern from the illumination controller 524, the driver 512 generates a driving signal for causing a variation with time of the light to be emitted from the marker 502. The marker 502 emits light in accordance with the driving signal output from the driver 512.

Because of this transmission apparatus 501, the server 300 can generate a more detailed basic index table 401 that also reflects the type of the load 511 being carried.

Although the above embodiments include no limitation regarding visible light, the communication may be performed using red, green, and blue lights or lights of other colors. The disclosure can also be applied to visible light communication in which information is modulated by means of only a variation in luminance with time.

The information transmitted from the marker 1 and the like may also be information on an error in devices provided with the marker 1 and the like, for example, other than the IDs, movements of fingers, and type of a load in the above embodiments.

The light sources in the marker 1 and the like should not necessarily be LEDs. For example, a part of the LCD, PDP, or EL display constituting the display may function as light sources.

The server 300 may be equipped with the camera 200 therein.

In the above embodiments, the program to be executed may be stored for distribution in a non-transitory computer-readable recording medium, such as a flexible disk, a compact disc read-only memory (CD-ROM), a digital versatile disc (DVD), or a magneto-optical (MO) disc. In this case, this program is installed into a computer to configure a system executing the above-explained operations.

Alternatively, the program may be stored in a disk drive or the like included in a certain server on a network, such as the Internet, and may be downloaded into a computer, for example, by superimposing the program onto carrier waves.

If the above functions are shared by an operating system (OS) or achieved by cooperation between the OS and application, only the data other than the OS may be stored in a medium for distribution or downloaded into a computer, for example.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information management apparatus comprising:
at least one processor configured to execute a program stored in a storage, wherein
the at least one processor
acquires sequentially captured frames of a plurality of light sources,
acquires movement states of positions of the plurality of light sources in an imaging area based on light source images of the plurality of light sources contained in the acquired frames, the plurality of light sources transmitting information including illumination patterns indicating respective IDs of the plurality of light sources, and
determines a kind of an operation based on movement states of positions of the plurality of light sources transmitting information including illumination patterns of the light indicating the respective IDs of the plurality of light sources.

2. The information management apparatus according to claim 1, wherein
the at least one processor
specifies a start frame at start of a displacement of the light source from the acquired frames, and
causes the storage to store the start frame for the movement state.

3. The information management apparatus according to claim 2, wherein in a case in which the at least one processor acquires the movement state, the at least one processor acquires information including a variation in at least one of a length and an angle of a movement vector of at least one of the plurality of light sources.

4. The information management apparatus according to claim 3, wherein
the at least one processor
determines (i) whether variations in lengths of movement vectors of at least part of the plurality of light sources are equal to or more than a first predetermined threshold, (ii) whether the lengths of movement vectors of at least part of the plurality of light sources are less than a second threshold that is less than the first threshold in a case in which the lengths of movement vectors of at least part of the plurality of light sources are determined not to be more than the first predetermined threshold, and (iii) whether a number of movement vectors of at least part of the plurality of light sources that are determined to be less than the first predetermined threshold and more than the second threshold is more than a preset value; and determines the kind of the operation based on movement vectors of at least part of the plurality of light sources, wherein the number of movement vectors of at least part of the plurality of light sources is more than the preset value.

5. The information management apparatus according to claim 2, wherein
the storage stores a reference information table serving as reference information for the information on movement of the plurality of light sources, and
in a case in which the information on movement of the plurality of light sources is acquired, the at least one processor determines whether the information on movement of the plurality of light sources matches the information in the reference information table.

6. The information management apparatus according to claim 5, wherein in a case in which the at least one processor determines that the information on the movements of the plurality of light sources does not match the information in the reference information table, the at least one processor causes a display to display an alert screen.

7. The information management apparatus according to claim 1, wherein the information transmitted from the plurality of light sources includes status information on objects of an operator equipped with respective ones of the plurality of light sources.

8. The information management apparatus according to claim 7, wherein
the at least one processor detects behaviors of the object, and
the status information includes information on the detected behaviors of the object.

9. The information management apparatus according to claim 7, wherein
the information stored in the storage is information indicating an operation process executed by the operator.

10. The information management apparatus according to claim 7, wherein
the object is a moving body for carrying a load, and
the status information includes information on existence of the load on the moving body or information on a type of the load.

11. The information management apparatus according to claim 1, wherein the at least one processor generates moving image data including the acquired frames.

12. An information management method executed by an information management apparatus comprises:
acquiring frames of a plurality of light sources sequentially captured by an imager;
acquiring movement states of positions of the plurality of light sources in an imaging area based on light source images of the plurality of light sources contained in the acquired frames, the plurality of light sources transmitting information including illumination patterns indicating respective IDs of the plurality of light sources; and
determining a kind of an operation based on movement states of positions of the plurality of light sources transmitting information including illumination patterns of the light indicating the respective IDs of the plurality of light sources.

13. The information management method according to claim 12, the method further comprising:
specifying a start frame at start of a displacement of the light source from the acquired frames, and,
causing the storage to store the start frame for the movement state.

14. The information management method according to claim 13, wherein in a case in which the at least one processor acquires the movement state, the at least one processor acquires information including a variation in at least one of a length and an angle of a movement vector of at least one of the plurality of light sources.

15. The information management method according to claim 14, further comprising:
determining (i) whether variations in lengths of movement vectors of at least part of the plurality of light sources are equal to or more than a first predetermined threshold, (ii) whether the lengths of movement vectors of at least part of the plurality of light sources are less than a second threshold that is less than the first threshold in a case in which the lengths of movement vectors of at least part of the plurality of light sources are determined not to be more than the first predetermined threshold, and (iii) whether a number of movement vectors of at least part of the plurality of light sources that are determined to be less than the first predetermined threshold and more than the second threshold is more than a preset value; and
determining the kind of the operation based on movement vectors of at least part of the plurality of light sources, wherein the number of movement vectors of at least part of the plurality of light sources is more than the preset value.

16. The information management method according to claim 12, wherein the information transmitted from the plurality of light sources includes status information on objects of an operator equipped with respective ones of the plurality of light sources.

17. The information management method according to claim 16, the method further comprising:
detecting behaviors of the object, wherein
the status information includes information on the detected behaviors of the object.

18. The information management method according to claim 16, wherein
the information stored in the storage is information indicating an operation process executed by the operator.

19. The information management method according to claim 16, wherein
the object is a moving body for carrying a load, and
the status information includes information on existence of the load on the moving body or information on a type of the load.

20. The information management method according to claim 12, the method further comprising generating moving image data including the acquired frames.

21. A non-transitory computer-readable recording medium storing a program thereon executable by at least one processor of an information management apparatus, wherein the program causes the at least one processor to
acquire frames of a plurality of light sources sequentially captured by an imager,
acquire movement states of positions of the plurality of light sources in an imaging area based on light source images of the plurality of light sources contained in the acquired frames, the plurality of light sources transmitting information including illumination patterns indicating respective IDs of the plurality of light sources; and
determine a kind of an operation based on movement states of positions of the plurality of light sources transmitting information including illumination patterns of the light indicating the respective IDs of the plurality of light sources.

* * * * *

UNITED STATES PATENT AND TRADEMARK OFFICE
CERTIFICATE OF CORRECTION

PATENT NO. : 11,676,286 B2
APPLICATION NO. : 17/166731
DATED : June 13, 2023
INVENTOR(S) : Nobuo Iizuka It is certified that error appears in the above-identified patent and that said Letters Patent is hereby corrected as shown below:

In the Claims

In Column 12, Claim 8, Line 29, delete "object," and insert -- objects, --, therefor.

In Column 13, Claim 17, Line 35, delete "object," and insert -- objects, --, therefor.

Signed and Sealed this
Twenty-sixth Day of December, 2023

Katherine Kelly Vidal
*Director of the United States Patent and Trademark Office*